M. BRENNER.
Improvement in Slaughtering Apparatus.

No. 125,015.  
Patented March 26, 1872.

3 Sheets--Sheet 1.

Witnesses.  
Inventor

3 Sheets--Sheet 2.
M. BRENNER.
Improvement in Slaughtering Apparatus.
No. 125,015. Patented March 26, 1872.
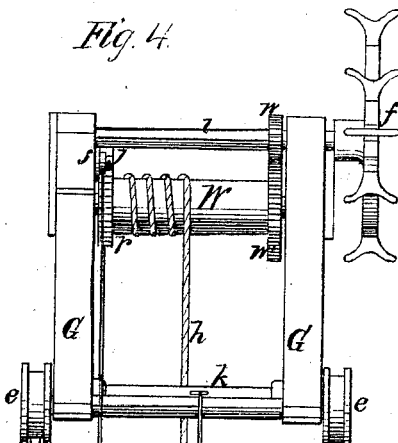
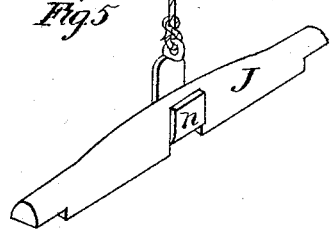
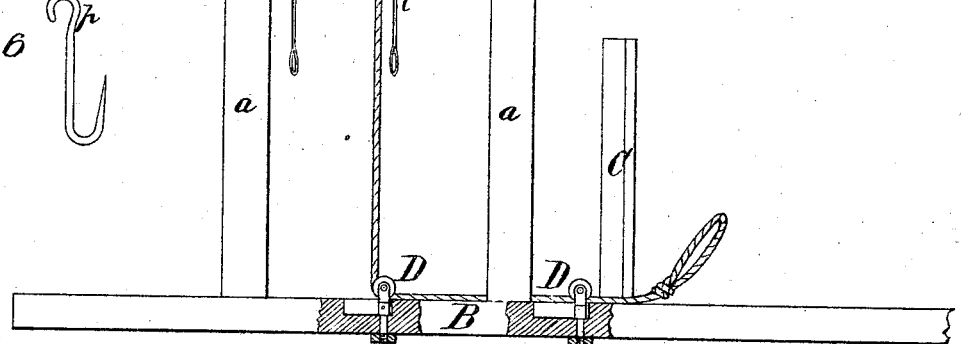

3 Sheets--Sheet 3.

M. BRENNER.

Improvement in Slaughtering Apparatus.

No. 125,015.  Patented March 26, 1872.

125,015

UNITED STATES PATENT OFFICE.

MOSES BRENNER, OF BALTIMORE, MARYLAND.

IMPROVEMENT IN SLAUGHTERING APPARATUS.

Specification forming part of Letters Patent No. 125,015, dated March 26, 1872.

*To all whom it may concern:*

Be it known that I, MOSES BRENNER, of the city and county of Baltimore and State of Maryland, have invented a new and Improved Apparatus for Slaughtering Cattle; and I do hereby declare that the following is a full, clear, and exact description thereof, reference being had to the accompanying drawing making part of this specification, in which—

Figure 2:
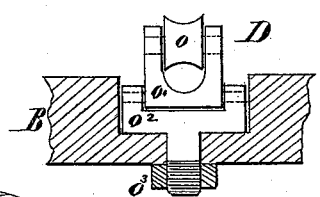
Figure 3:
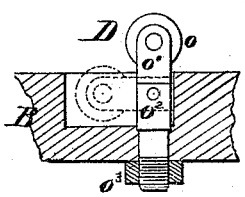
Figure 1:
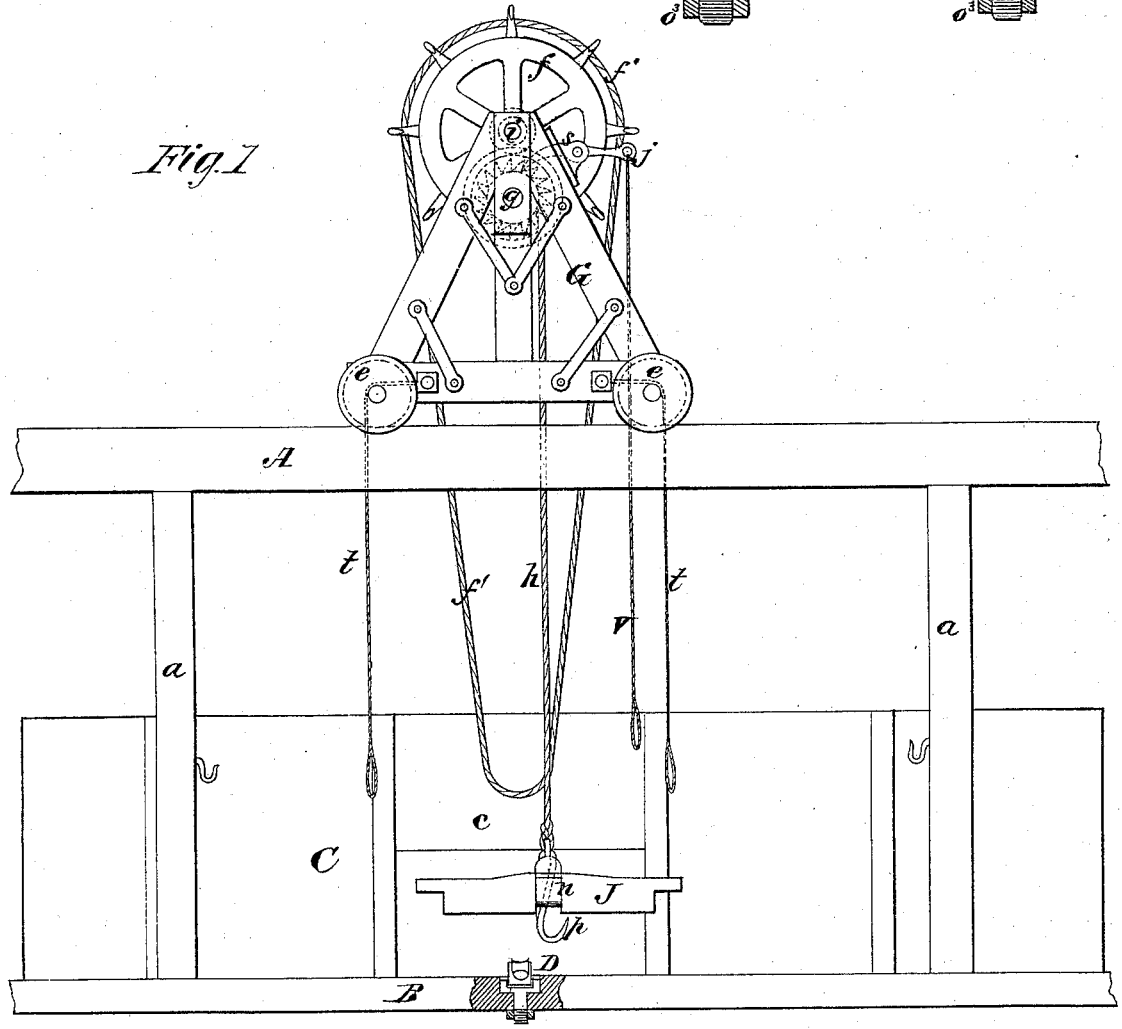
Figure 7:
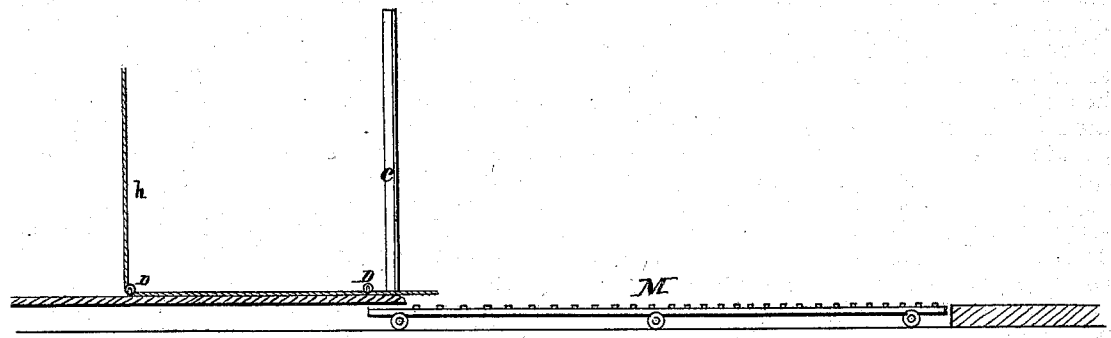

Figure 1, Plate 1, is an elevation of the apparatus, showing the cross-tree and hook applied to the bull-rope; and also showing the gate leading into the cattle-pen. Figs. 2 and 3, Plate 1, show the swivel-eye for the bull-rope. Fig. 4, Plate 2, is an elevation of one end of the apparatus. Fig. 5, Plate 2, is a perspective view of the cross-tree. Fig. 6, Plate 2, shows the hook. Fig. 7, Plate 3, shows a movable floor in the pen.

Similar letters of reference indicate corresponding parts in the several figures.

One object of this invention is to save labor and facilitate the work of slaughtering cattle by the arrangement in a slaughter-house of an elevated carriage, which can be moved back and forth on its ways by ropes applied to its ends, and which is provided with a windlass and bull-rope for drawing the animals down to the floor, a gravitating pawl, and a ratchet with a rope for releasing the windlass. Another object is to employ, in combination with a traveling carriage and windlass, a cross-tree which is adapted for hanging the animal by its hind legs for the purpose of removing the hide, and also a hook for suspending different parts of the quartered animal; and also to employ, in combination with the traveling windlass, one or more swivel-eyes for the bull-rope, which are applied to the floor of the slaughter-house in such manner that when they are not in immediate use they can be dropped into recesses made into the floor; all as will be hereinafter explained.

The following description of my invention will enable others skilled in the art to understand it.

In the accompanying drawing, A A represent ways, which are elevated above the floor B of the slaughter-house upon standards $a\ a$, and on which a carriage, G, is supported and moved about. The close fence C, with its door $c$, separates the slaughter-house from the cattle-pen. The carriage consists of a frame, G, properly braced and supported upon the ways or elevated tracks A A by means of wheels $e$, which are double flanged so that there will be no liability of lateral displacement of the carriage. In additional to the diagonal braces for each side of the carriage-frame there are transverse braces $k$, which prevent spreading of the frame. Near the top of frame G is a shaft, $i$, carrying a pinion, $w$, and a large rope-wheel or pulley, $f$, over which an endless rope, $f'$, passes and hangs down within reach of a person on the floor B, as shown in Fig. 1. The pinion $w$ engages with the teeth of a spur-wheel, $w'$, which is fast on one end of a winding-drum, W. On the opposite end of the drum W a ratchet-wheel, $r$, is applied; and pivoted to a bracket, $s$, on the frame G, is a gravitating pawl, $j$, to the outer end of which a cord, V, is attached for allowing a person on the floor B to raise the pawl from the ratchet-wheel. Two ropes, $t\ t$, which are attached to bars $k$ at opposite ends of the carriage-frame, are used for moving the latter about on its ways A A. A rope, $h$, is wound upon and attached to the drum W, which I term the bull-rope. It hangs from the drum and is passed through swivel-eyes D D, when it is desired to draw an animal down to the floor for killing. It is also used as a hoisting-rope, as will be hereinafter explained. Each swivel-eye D consists of a swivel-bearing, $O^1$, between the ends of which a pulley or anti-friction roller, $o$, is applied. This bearing is pivoted between the ends of another bearing, $O^2$, which has a screw on it that passes through the floor B, and is confined by a nut, $O^3$, as clearly shown in Figs. 2 and 3. This device is applied into a recess made into the floor B, in front of the pen-door $c$, so that when it is not in immediate use it can be turned down out of the way, as indicated in Fig. 3 in dotted lines, and when in use it is elevated and the rope $h$ passed through the bearing $O^1$. The rope $h$ has a stirrup, $n$, attached to it, which stirrup is received into a notch made into a cross-tree, J, the ends of which are reduced so that they can be passed between the tendons and bones of an animal's leg for suspending the animal by the rope $h$ when it is desired to skin and dress the animal. The hook $p$ is attached to an eye on stirrup $n$ and used for suspending parts of the animal.

Hitherto butchers have required several men to drive the stock into the slaughter-house and a number of men to draw the stock to the place of slaughtering. By my improved apparatus I obviate the necessity of all this labor as follows: A man proceeds with a rope, $h$, to which is attached a loop, to the pen and throws the loop over the head of the bullock; he then enters the slaughter-house and draws the rope through the swivel-eyes D and attaches it to the drum W on the carriage G; then, by means of the rope $f'$ on pulley $f$, the bullock is easily drawn head downward to the floor, in which position he is held until killed. The butcher then cuts into the hind legs just below the joint of the hoof, and, after removing the latter, inserts the ends of the cross-tree between the tendons and bones and attaches the cross-tree to the stirrup $n$ of the rope $h$. The butcher then commences to skin and dress the animal, and as he progresses he raises the animal by means of the pulley-rope $f'$, the pawl and ratchet, above described, keeping the animal at the height desired. This pulley-rope $f'$ allows the butcher to raise the animal with perfect ease, and as the animal is thus raised the hide is kept clear and in a good condition for the tanner.

The ways on which the carriage travels may be extended far enough outside of the slaughter-house door to allow the butcher to move the dressed animals with perfect ease into a wagon.

The windlass and carriage will allow cattle to be lowered entire into an ice-house beneath the slaughter-house floor and left hanging over the ice below, thus avoiding the old method of cutting up the animals.

In practice I propose to have arranged in the pen in front of the door $c$, through which the animals are drawn, a movable floor, M, which will be mounted on wheels and so arranged as to be moved beneath the slaughter-house floor B. When the animal is drawn upon this floor he will lose his purchase to hold back, and can be drawn down to the place for killing him with perfect ease. I have represented this movable floor by Fig. 7, Plate 3.

Having described my invention, what I claim as new is—

1. In a machine adapted for slaughtering animals, I claim the combination of the elevated railway A A, traveling carriage G, windlass-drum W, rope $h$, having a device for taking hold of the animal at its lower end, the pawl $j$, ratchet $r$, ropes $v$ and $t$ $t$, pulley $f$, and rope $f'$, substantially in the manner and for the purpose described.

2. The cross-tree J, and stirrup $n$, in combination with a rope, $h$, and traveling windlass, substantially as described.

3. The swivel-eye D, constructed as described, and inserted into a recess in the floor B, substantially as set forth.

MOSES BRENNER.

Witnesses:
G. E. SANGSTON,
W. A. HAMMOND.